United States Patent [19]

Planeta

[11] 4,316,356
[45] Feb. 23, 1982

[54] LAWN MOWER FOR CUTTING ON AN INCLINED SURFACE

[76] Inventor: Eugene J. Planeta, 5059 NE. 13th Ave., Ft. Lauderdale, Fla. 33334

[21] Appl. No.: 173,184

[22] Filed: Jul. 28, 1980

[51] Int. Cl.³ .............................................. A01D 35/28
[52] U.S. Cl. ..................................... 56/16.2; 56/17.2; 56/DIG. 22
[58] Field of Search ...................... 56/16.2, 17.1, 17.2, 56/15.8, 15.9, DIG. 10, DIG. 22, 15.7, 6, 209

[56] References Cited

U.S. PATENT DOCUMENTS

| | | | |
|---|---|---|---|
| 2,750,204 | 6/1956 | Ohrmann | 56/209 |
| 2,949,004 | 8/1960 | Jones | 56/DIG. 22 |
| 2,982,080 | 5/1961 | Martin | 56/6 |
| 3,077,065 | 2/1963 | Samways et al. | 56/15.8 |
| 3,118,268 | 6/1964 | Benz | 56/17.2 |
| 3,154,903 | 11/1964 | Smith | 56/DIG. 10 |
| 3,408,798 | 11/1968 | Hale et al. | 56/209 |
| 3,543,490 | 12/1970 | Erickson | 56/DIG. 22 |
| 3,601,958 | 8/1971 | Roof | 56/6 |
| 3,641,748 | 2/1972 | Vose | 56/16.2 |
| 3,680,292 | 8/1972 | McCansie | 56/15.8 |
| 4,120,136 | 10/1978 | Rose | 56/15.8 |
| 4,231,215 | 11/1980 | Klas | 56/DIG. 22 |

*Primary Examiner*—Paul J. Hirsch
*Attorney, Agent, or Firm*—Malin & Haley

[57] ABSTRACT

A rotary blade type cutting system for cutting grass or the like at a uniform height either on a flat surface, an inclined surface, or along the border adjacent a surface depression. The system is especially useful for cutting the bordering grass around golf course sand traps. The cutting system is pivotally attached to a motorized tractor and comprises a blade housing which contains the cutting blades, a plurality of support members for connecting the housing to the tractor such that the attitude of the housing (the plane of the cutting blade) with respect to the tractor is variable about the center line, longitudinal axis relative to the tractor, an adjustable guide roller connected to the housing to maintain the cutting blades at a predetermined height above the ground, a drive train for transmitting mechanical power from the motor of the tractor to the cutting blades, and a control arm having one end connected to the housing distal of the longitudinal center line of the tractor, positioned adjacent the operator's compartment of the tractor, such that the operator can manually tilt the blade housing. A portion of the housing extends laterally beyond the outside of the wheels so that the tractor can remain on the substantially flat portion of the ground while the housing is tilted to cut the grass along the inclined portion of the ground or along a flat segment that drops off sharply (around a pit or depression).

2 Claims, 5 Drawing Figures

LAWN MOWER FOR CUTTING ON AN INCLINED SURFACE

BACKGROUND OF THE INVENTION

This invention relates to lawn mowers and more particularly to the rotary blade type cutting system which is pivotally attached to a motor driven tractor for cutting grass or the like at a uniform height either on a flat surface, an inclined surface, or along the border of a ground depression.

In the past, there have been various devices for cutting on an embankment or hill in a lateral path. By way of example in U.S. Pat. No. 3,465,505 in which a lawn mower is illustrated. The lawn mower has wheels pivotally connected to the blade housing so that the housing may assume various angles with respect to the wheels. The mower handle is connected to the wheels so that the wheels will remain vertical when the handle is held vertical. The pivot point between the housing and wheels is at a plane below the plane of the wheel axles to minimize unleveling of the motor. However, this is a push type mower which is specifically designed to prevent the mower from flipping down the hill or embankment by allowing the wheels to be maintained vertical while the housing is maintained substantially level to the surface being cut. This device would not operate along an incline or sharp drop off without cutting the grass too short.

However, the present invention is designed for use with a ride-on mower for use around areas where the incline portion of the surface to be mowed is not practically accessible for supporting the wheels of the mowing device, such as those inclined surfaces found around the areas of sand traps on golf courses. The present invention enables the wheels of the tractor to still be driven along the flat portion of the surface while allowing the blade housing to be tilted to the angle of the inclined surface in order to cut the grass on the inclined surface at a uniform height without shearing the grass too close. The blade housing can be returned to normal position which is in a plane parallel to the flat surface to resume cutting along the flat surface when necessary.

In the past, it has been necessary to use other hand tools or a manually driven mower to cut the areas around the sand traps and the like while using the ride-on lawn mower to cut the flat surfaces of the golf course. The present invention provides a cutting system which can be used to accomplish the cutting of the grass on both flat surfaces and the inclined surfaces, thus saving time and reducing the labor force needed to maintain such areas.

SUMMARY OF THE INVENTION

According to the present invention, a rotary blade type cutting system for cutting grass or the like either on a flat surface, an inclined surface, or the border around a surface depression at a uniform height is presented. The system is attached to a motor driven tractor and comprises a blade housing which contains the cutting blades, a plurality of supporting members for connecting the housing to the tractor such that the attitude of the housing (the plane of rotation of the cutting blade) with respect to the tractor is variable about a longitudinal axis relative to the tractor and an adjustable guide roller connected to the housing to maintain the cutting blades at a predetermined height above the ground, a drive train for transmitting mechanical power from the motor of the tractor to the cutting blades, and a control arm having one end connected to the housing distal of the longitudinal center line of the tractor, positioned adjacent to the operator's compartment of the tractor, such that the operator can manually tilt the blade housing.

When cutting grass on a flat surface, the blade housing normally rides on a plane parallel to the flat surface being mowed. The height of the blade housing and cutting blade or blades above the flat surface can be adjusted by varying the length of the support members. On gradual sloping surfaces which are accessible by the tractor, the blade housing can be maintained in its normal position and the grass cut at a uniform height, just as if the surface was completely flat.

However, when the angle of the inclined surface is drastic or the inclined surface is such as to be inaccessible by the tractor, the wheels of the tractor can be maintained on the flat surface. A portion of the blade housing extends laterally beyond the outside of the tractor wheels so that the tractor can remain on the substantially flat portion of the ground while the housing is tilted to cut the grass along the inclined portion of the ground. A guide roller on the front distal edge of the blade housing rides along the junction of the flat surface with the inclined surface maintaining the blade housing a predetermined distance above the surface so that the grass is still cut at a uniform height without being sheared and the junction is not torn apart by contact with the cutting blades.

When the cutting of the inclined surface is finished, the control arm is released and the blade housing returns to its normal position.

It is therefore an object of this invention to provide a rotary blade type cutting system which can be pivotally attached to a motorized tractor which enables the operator of the tractor to cut grass or the like either on a flat surface, an inclined surface, or along the border of a ground depression.

It is another object of this invention to provide a rotary blade type cutting system which can be attached to a motor driven tractor having a blade housing with at least one end extending laterally beyond the wheel base of the tractor to enable an inclined surface to be cut while the tractor remains on a substantially flat surface allowing tilting the blade housing to match the angle of incline.

It is yet another object of this invention to provide a rotary blade type cutting system which can be pivotally attached to a motor driven tractor which reduces the maintenance costs for landscapes having multiple contours such as a golf course or the like.

In accordance with these and other objects which will be apparent hereinafter, the instant invention will now be described with particular reference to the accompanying drawings.

DESCRIPTION OF THE PREFERRED EMBODIMENT

Figure 1:
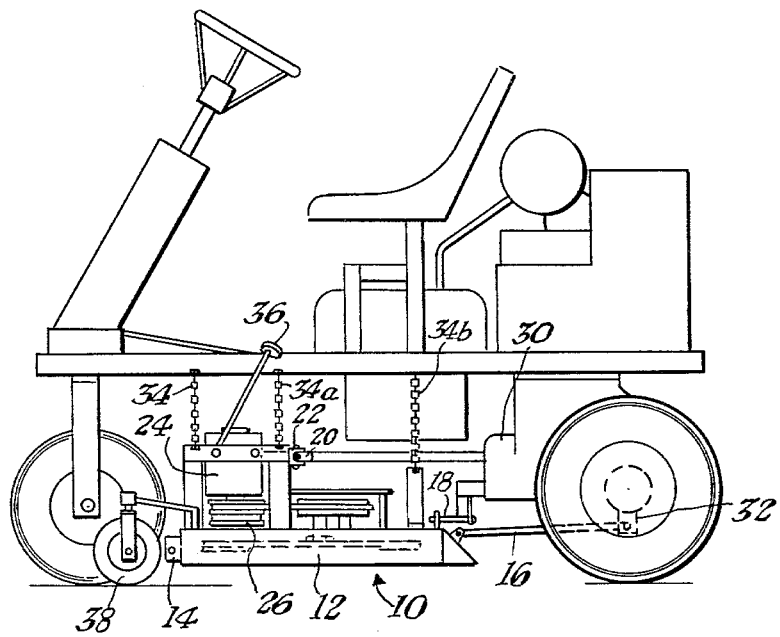
FIG. 1 is a side elevational view of the invention attached to a ride-on tractor.
Figure 2:
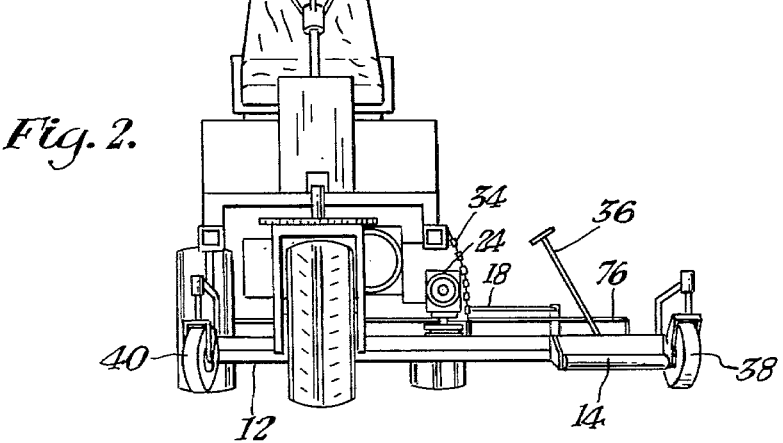
FIG. 2 is a front elevational view of the invention connected to a ride-on tractor.

Referring now to FIGS. 1 and 2, the invention is shown generally at 10. The rotary blade cutting system 10 is connected to the frame of a tractor by the supporting members 34, 34a, and 34b. The rotary blade cutting system 10 comprises a blade housing 12, an adjustable guide roller 14 connected to the front of the housing 12, a pair of stabilizer bars 16 and 16a (now shown) having one end connected to the blade housing 12 and the other end connected to the rear axle 32 of the tractor. Stabilizer bars 16 and 16a prevent twisting movement of the blade housing 12 and also longitudinal movement of the housing either forward or rearward. The lateral movement of the blade housing 12 is prevented by use of a torsion bar 18 having one end connected to the blade housing 12 and the other end connected to the motor 30 of the tractor. The rotary blades (not shown) are driven by a dual pulley system 26 which is connected to the gear box 24 which transfers the direction of the rotational movement of the drive shaft 20 which is connected to the motor of the tractor 30. The drive shaft 20 is connected to the gear box 24 by way of a universal joint 22. The housing also has a manual control arm 36 connected thereto in order to control tilting movement of the blade housing 12 with respect to the tractor. The blade housing also includes a pair of wheels 38 and 40 connected to the respective front corners of the housing in order to give added support to the housing when being used on a substantially flat surface.

Figure 3:
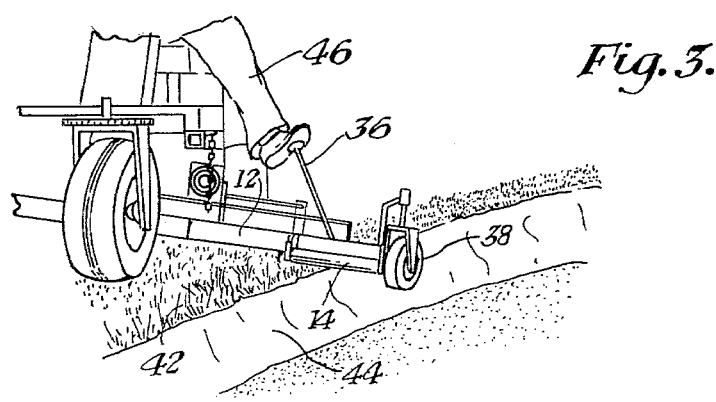
FIG. 3 is a fragmentary perspective view of the invention in use around the sandtrap of a golf course.

Referring now to FIG. 3, the rotary blade cutting system 10 is shown in use on the edge of the sandtrap of a golf course. As the tractor rides along the substantially flat surface of the grass portion adjacent the sand trap, the operator of the tractor can use his leg 46 to place downward force on the control arm 36 in order to tilt the housing 12 in order to maintain the proper incline where the grass meets the slope of the sand trap. Downward force is maintained on the control arm 36 to keep the guide roller 14 riding along the edge where the grass meets the sand. The wheel 38 does not interfere with the incline of the blade housing and is free riding over the sandtrap 44 area. Guide roller 14 maintains the proper blade height with respect to the grass 42 and allows cutting of the grass without the use of hand tools or a manually pushed lawn mower.

Figure 4:
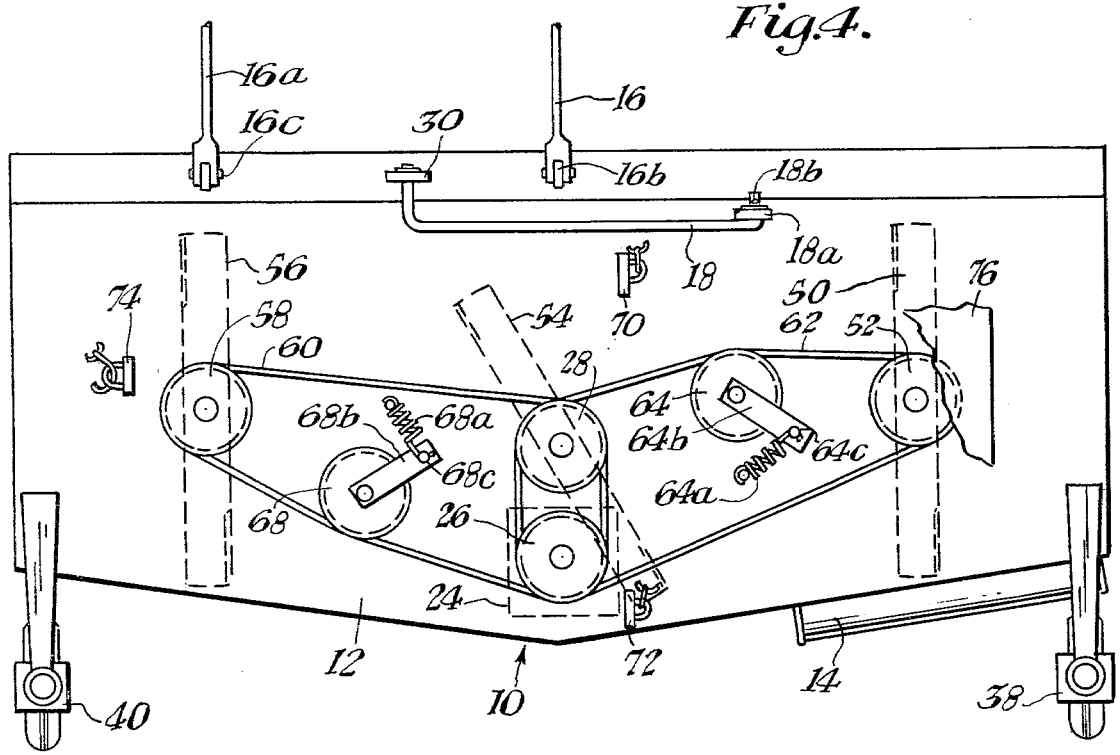
FIG. 4 is a top plan view of the invention.
Figure 5:
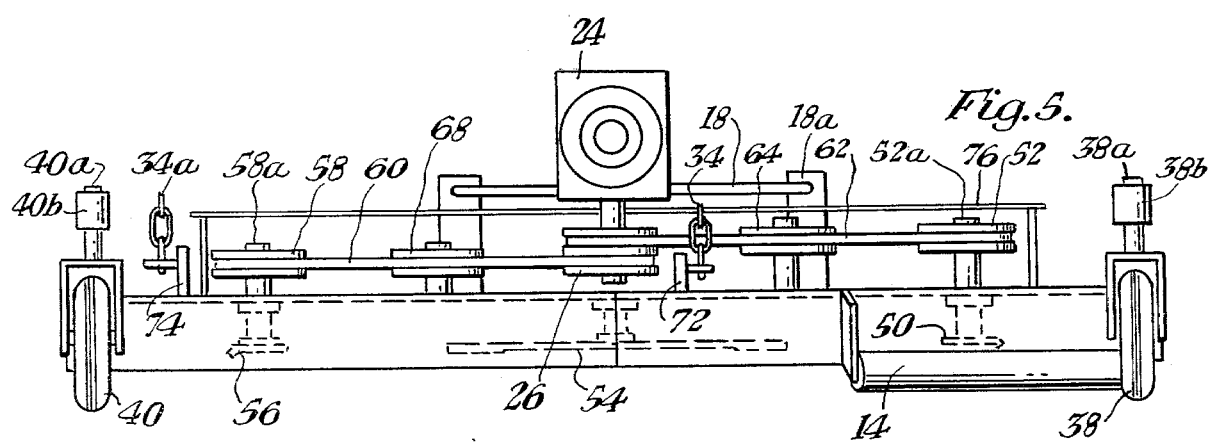
FIG. 5 is a front elevational view of the invention.

Referring now to FIGS. 4 and 5, the rotary blade driving system is more particularly described. The blade housing 12 has a pair of stabilizer arms 16 and 16a which are pivotally connected to the blade housing by the pins 16b and 16c which allows the housing 12 to be tilted when necessary, but still preventing twisting movement of the housing. The other ends of the stabilizer bar 16 and 16a are also pivotally connected to the rear axle of the tractor (not shown). Transverse or lateral displacement of the housing 12 is prevented by use of the torsion bar 18. One end of the torsion bar 18 is connected to the bracket 18a and is kept in that position by use of a cotter key 18b or any other similar device which keeps the torsion bar 18 from sliding out of the bracket 18a. Similar means can be used to connect the other end of the torsion bar 18 to the motor 30 allowing pivotal movement of the torsion bar 18 in the motor bracket 30. The housing 12 includes the brackets 70, 72, and 74 which enables the housing 12 to be connected to the frame of the tractor. It should be noted that the position of these brackets are critical so that the housing is maintained in a level position when in normal use and can hang from the chains 34, 34a and 34b (as shown in FIG. 1). It should be also noted that a more sophisticated system of hydraulic cylinders could be used to replace the control arm 36 and the chain support members 34, 34a and 34b in order to tilt the housing 12 when desired. In addition an automatic hydraulic sensing system could be added to constantly adjust the hydraulic cylinders to maintain the proper housing angle with respect to the surface being worked upon. However the method shown in the drawing is preferred to keep the cost of the device reasonable. As can be seen three rotary blades 50, 54 and 56 are preferred, although other blade arrangements obvious to one skilled in the art could be substituted therefor. The main gear box 24 drives the dual drive pulley 26 which has the pulley belts 60 and 62 connected thereabout. The center blade 54 is also driven by a dual pulley 28. The pulley belt 60 is fed around the lower pulley of the dual drive pulley 26 and also the lower pulley of the dual pulley 28, over the tension pulley 68 and around the pulley 58 which drives the leftmost blade 56. The pulley belt 64 feeds about the top pulley of the dual pulley drive 26 and the top pulley of the dual pulley 28 over the second tension pulley 64 and about the pulley 52 which drives the rightmost blade 50. A cover 76 can be used to cover the system of belts and pulleys in order to protect the tractor driver when in use. Each front corner of the housing 12 has a respective bracket 38b and 40b connected thereto which is designed to swivelly engage a respective wheel bracket 38a and 48a which allows swivel movement of the wheels 38 and 40 which are used to provide additional support for the housing 12 when the system is being used to cut along a substantially flat surface.

Each of the two tension pulleys 64 and 68 are connected to the housing 12 by a two bracket system having the respective members 64a and 64b and 68a and 68b. The bracket members 68a and 68b are pivotally connected to each other by a pin 68c and the bracket 64a and 64b are connected to each other by pin 64c. Tension can be maintained on the belt 60 and 62 either by manually adjusting the angle between the respective bracket members 68a and 68b or 64a and 64b, or spring tension by use of a spring between the respective members 68a and 68b and 64a and 64b can also be used to automatically maintain the proper tension of the pulleys.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A rotary blade type cutting system for cutting on an inclined surface, flat surface and along the border of a ground depression, pivotally attached to a motorized ride-on tractor comprising:
    a blade housing;
    at least one blade, rotatably mounted to said housing;
    a driving means for driving each said blade operably connected to said tractor and said housing;
    said blade housing having a first end and a second end, said first end extending laterally beyond the wheel base of said tractor, the front of said housing having at least one wheel connected thereto for supporting said blade housing while on an inclined or flat surface, the front of said first end of said blade housing including an elongated, guide roller rotatably mounted thereto, such that a portion of the lower periphery of said guide roller extends below the edge of said blade housing regulating the height of the cut of said blade when cutting along the border of a ground depression;

at least a first and second flexible support member connecting the approximate mid section of said blade housing to said tractor;

at least a third flexible support member connecting said second end to said tractor;

said first, second and third flexible support members positioned to allow manual pivoting of said blade housing about a longitudinal axis relative to the tractor;

a manual control arm to allow manual privoting of said blade housing by the operator of said tractor, one end of said arm connected to said first end.

2. A rotary blade cutting system as set forth in claim 1, further comprising:

stabilizing means for preventing swinging movement of said blade housing on said flexible support members and to inhibit rotation of said blade housing.

* * * * *